United States Patent Office 2,696,390
Patented Dec. 7, 1954

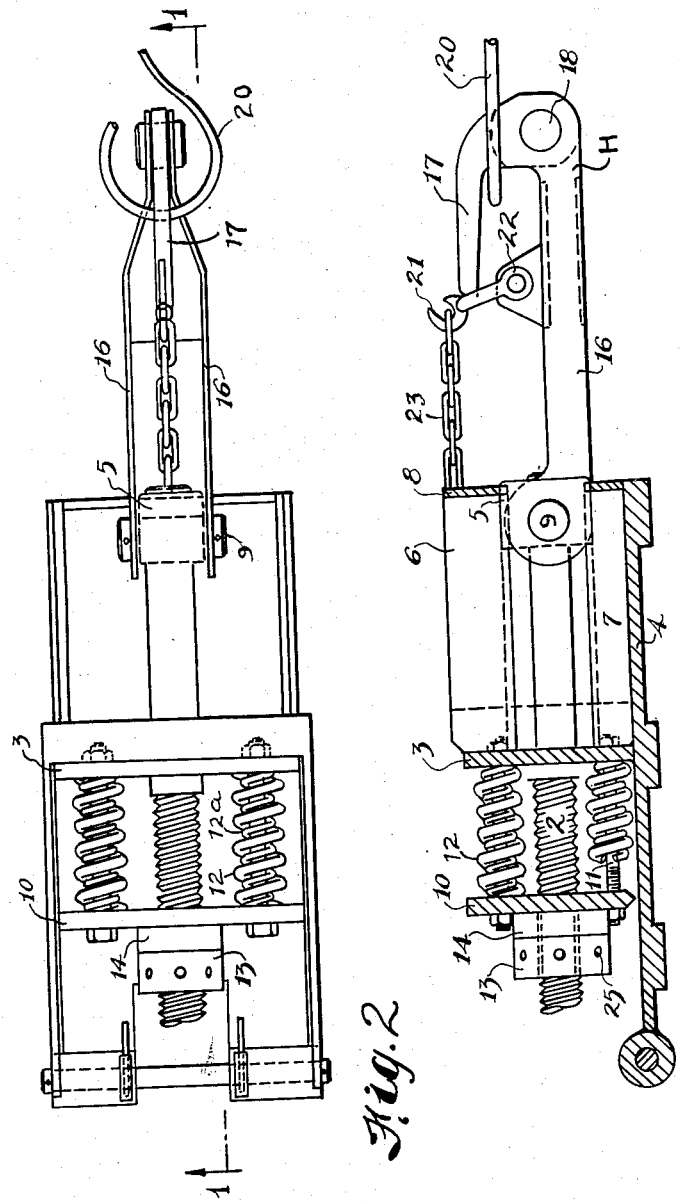

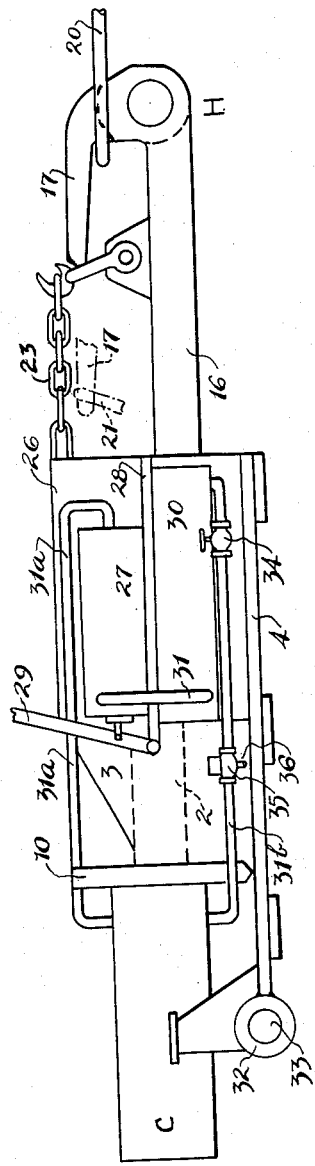
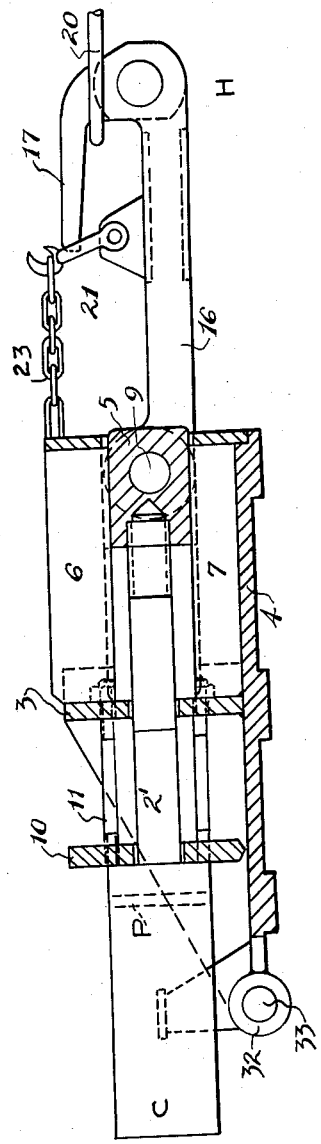

2,696,390

COUPLING DEVICE WITH OVERLOAD RELEASE

Joseph B. Smith, Cleveland, Ohio, assignor to The Standard Oil Company, Cleveland, Ohio, a corporation of Ohio Application January 12, 1950, Serial No. 138,097

4 Claims. (Cl. 280—453)

This invention relates to coupling devices or hitches, particularly for heavy duty usages, and in accordance with the invention a construction may be had which can withstand the severe stresses such as incurred in the towing of barges, or heavy haulage towing with land vehicles. Other objects and advantages will appear from the following description.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a longitudinal vertical sectional view of an embodiment of the invention, taken on a plane substantially indicated by section line I, Fig. 2;

Fig. 2 is a plan view;

Fig. 3 is a side elevational view showing a modification; and

Fig. 4 is a longitudinal vertical section of the same.

Referring more particularly to the drawing, there is shown at Fig. 1 a towing hook H which is connected to the end of a take-up stem 2, this being longitudinally movable within the limits determined by the dimensions of the device. The take-up stem rides freely through an opening in an upright plate 3 which is fixed to a floor plate 4. On the end of the take-up stem 2 is a crosshead 5 which rides between upper and lower longitudinal guides 6, 7, these being in fixed position between the plate 3 and end plate 8. The crosshead then is in turn connected to the end of the tow hook H, connection for instance being by means of a pin 9 through openings in the hook end and the crosshead. The assembly of tow hook, crosshead and take-up stem is thus capable of movement for take-up, as permitted by the length of run on the guides 6, 7. The take-up stem 2 passes loosely through an abutment plate 10, and studs 11 extend between said plate and plate 3, the plate 10 being permitted some independence of movement on the base 4, shock-absorber springs being interposed between the plates 10 and 3, whereby in temperature change contraction and expansion or on abrupt jerks, there may be slight yielding to prevent breakage. Preferably, there may be large springs 12 and intermediate springs 12a on the studs. A large spring may also be arranged on the stem 2 if desired. To take up the slack in making a coupling, a nut 13 is screw-threaded on the stem 2, this thrusting against the plate 10, desirably a ball bearing 14 being interposed.

The hook is of releasable type, involving a link portion 16 which is connected to the crosshead 5, and end portion 17 which is pivoted onto the link portion 16 by a pin 18 passing through aligned openings. As seen in Fig. 2, the link portion 16 actually involves a pair of bars, one at each side of the crosshead at one end, and at each side of the pivoted portion 17 at the other end. This increases the stability and the resistance of the structure against side stresses. It will be understood that the structure as afore-enumerated is fastened to one of the barges or vehicles or towing means, and the other barge or vehicle is connected to the hook H by a suitable link or for instance a wire rope eye 20. Normally, the pivoted portion 17 of the hook H is locked against release by a shackle 21 which is pivoted at 22 to the hook member 16, and is swung into position over the end of the hook portion 17. A chain 23 slackly connects from the plate 8 to hook on the lug of the upper end of the shackle 21. By this arrangement, when it is desired to release the tow line the nut 13 would be loosened until the chain pulls the shackle from hook 17. In making up the tow connection, the eye 20 of the tow rope is brought into position to hook over the pivoted portion 17, the nut 13 having been slacked off sufficiently to allow the hook H to be brought into its extended position therefor. The pivoted portion 17 being turned down into normal position, and the shackle 21 swung back over the pivoted portion 17, the nut 13 is turned up to tighten the hitch to the desired extent and the chain is hooked onto the shackle lug. If the nut 13 is of power nut type, by a ratchet form of wrench, or a long spanner wrench cooperating with the holes 25, very heavy loads can be readily handled.

In the form of construction shown in Figs. 3 and 4, the tow hook and the crosshead are as described foregoing, viz. the hook embodies the link portion 16 and pivoted portion 17, the former being connected to the crosshead 5 which again can have longitudinal movement between the guides 6 and 7. The locked position of the hook element 17 is shown in dotted lines in Fig. 3, it being held by the shackle 21. The position for release is shown in full lines. The take-up stem 2' is a piston rod provided with a piston P in a cylinder C, the latter being secured to the plate 10 in such manner as desired. A shock-absorber, as springs or an air-chamber shock-absorber, may be interposed between the plate 10 and the plate 3. With this construction, as in the foregoing, the hitch connection is made by slacking off the hook H and its take-up stem 2', and opening the pivot portion 17 and placing the tow link or rope eye 20 thereover, and with the shackle 21 in place over the pivoted portion 17 fluid pressure is introduced into the cylinder C to draw up and tighten the tow line, and the chain is hooked on the shackle. The fluid pressure for this may be provided by a motor-driven or hand, pump 27 carried on a bracket plate 28 projecting from the side plate 26. A lever 29 pivoted at any desired point, e. g. to plate 28 is provided for reciprocating the plunger in the pump cylinder 27. A motor drive operating the pump has an advantage that it can be controlled from a central point to release a plurality of barges simultaneously. Desirably, the fluid employed may be a hydrocarbon oil which is pumped from the reservoir container 30 which is also a part of the unit, being located under the bracket plate 28, and connected by a suitable conduit 31 to the pump, and the latter in turn is connected by a conduit 31a to the cylinder C, while a return conduit 31b having a control valve 34 for discharge leads back to the reservoir.

If a safety release valve 35, Fig. 3, be provided from the cylinder, set for release just above normal operating pressure, oil can flow from the cylinder to escape-line 36 on unusual stress, and the hook H then moves out to pull free from the shackle 21, and the pivoted portion 17 releases the tow line before breakage occurs at some point.

The base plate 4 carrying the device may be conveniently attached to a barge or other structure by a hinge-type joint, the hinge eye 32 co-acting with fixed hinge eye portions on the barge or the like, a pin 33 aligning through the assembly. With this, a slight vertical rocking may be permitted.

Other modes of applying the principle of the invention may be employed, change being made as regards the details described, provided the features stated in any of the following claims or the equivalent of such be employed.

I therefore particularly point out and distinctly claim as my invention:

1. In a coupling device having a releasable hook portion and a hook body and a stem to which the hook body is connected, the combination of means for tightening up slack and means for axial yield-extension and means for limited yield movement in a plane angular to the axis, including a positive drawback take-up for the stem, a base carrying the stem and hook body, and a series of joints for movement in the plane of the releasable hook portion, one joint being between the releasable hook portion and the hook body and another between the hook body and the stem and another as coacting hinge eyes on said base and its support.

2. In a coupling device having a releasable hook portion and a hook body to which the releasable hook portion is pivoted and a stem to which the hook body is pivotally connected, the combination including a crosshead to which said hook body is pivoted, a longitudinal guideway on which said crosshead rides, and means operable to move the stem.

3. In a coupling device having a releasable hook portion and a hook body to which the releasable hook portion is pivoted and a stem to which the hook body is pivotally connected, the combination including a crosshead to which said hook body is pivoted, a longitudinal guideway on which said crosshead rides, a piston on said stem, a cylinder for said piston, and means for supplying pressure-fluid thereto to move the stem.

4. In a coupling device having a releasable hook portion and a hook body to which the releasable hook portion is pivoted and a stem to which the hook body is pivotally connected, the combination including a crosshead to which said hook body is pivoted, a longitudinal guideway on which said crosshead rides, a piston on said stem, a cylinder for said piston, and means for supplying pressure-fluid thereto to move the stem, including a pump and a reservoir mounted alongside the guideway.

References Cited in the file of this patent

UNITED STATES PATENTS

| Number | Name | Date |
|---|---|---|
| 331,284 | Davis | Dec. 1, 1885 |
| 1,343,908 | Edstrom | June 22, 1920 |
| 1,356,741 | Roberton | Oct. 26, 1920 |
| 1,375,605 | Pepper | Apr. 19, 1921 |
| 1,650,680 | Youse | Nov. 29, 1927 |
| 1,742,690 | Chapman | Jan. 7, 1930 |
| 2,512,733 | Andersen et al. | June 27, 1950 |